United States Patent Office 2,808,104
Patented Oct. 1, 1957

2,808,104

SHEAR FOR METALLIC STOCK

Edward C. Peterson, Reading, Pa., assignor to Birdsboro Steel Foundry and Machine Company, Reading, Pa., a corporation of Delaware Application October 20, 1955, Serial No. 541,729

11 Claims. (Cl. 164—34)

The present invention relates to shears for shearing metal parts and especially to flying shears adapted to cut travelling stock from a rolling mill or the like as it is moving.

A purpose of the invention is to cut travelling stock or work with less damage to the cut ends and particularly without laterally deforming or bunging the ends adjacent the point of cut.

A further purpose is to secure more accurate shearing of rolling mill stock and the like with less damage to the work.

A further purpose is to produce a flying shear with a longer service life and less likelihood of damage during service.

A further purpose is to grasp the stock adjoining the point of shearing between gags and to operate the shear in response to further application of the gripping pressure, desirably by hydraulic mechanism interposed in the line of pressure application.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1:
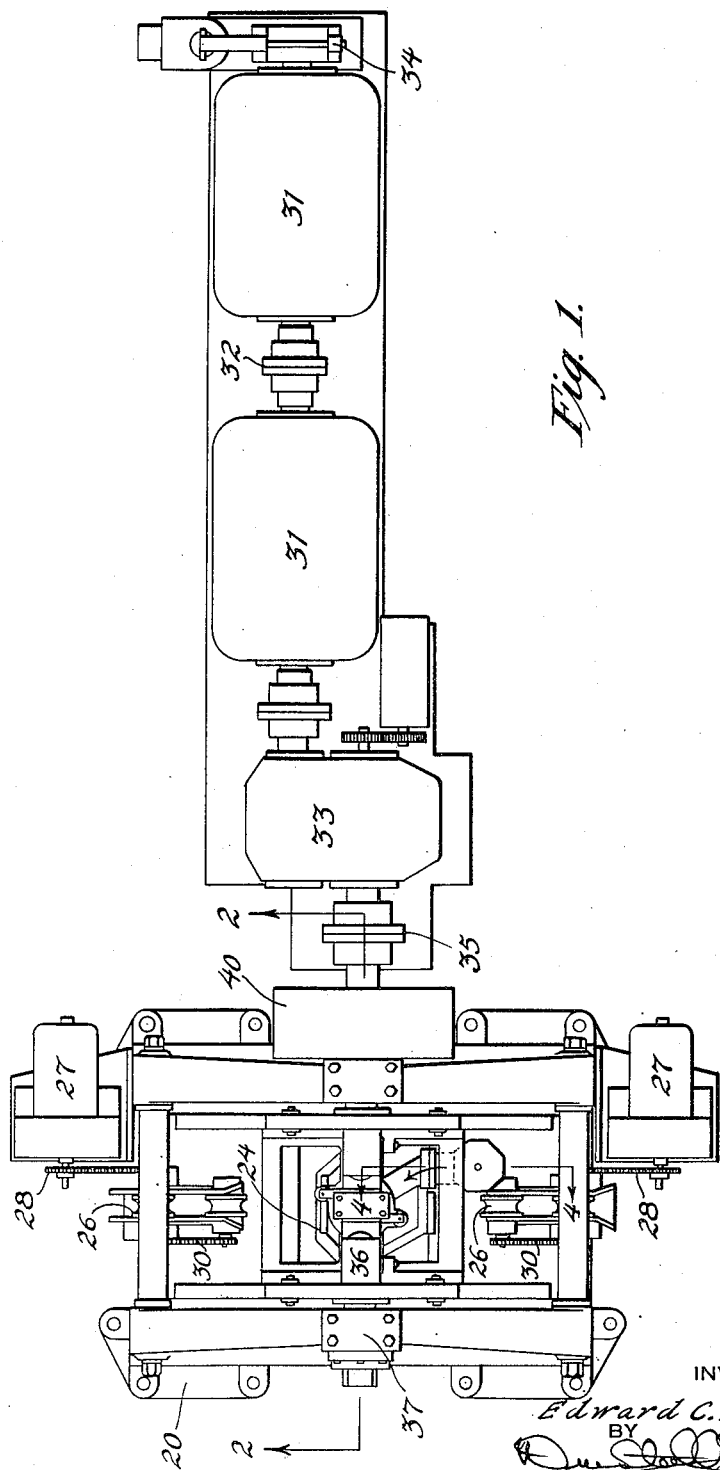
Figure 1 is a top plan view of a flying shear according to the invention.
Figure 2:
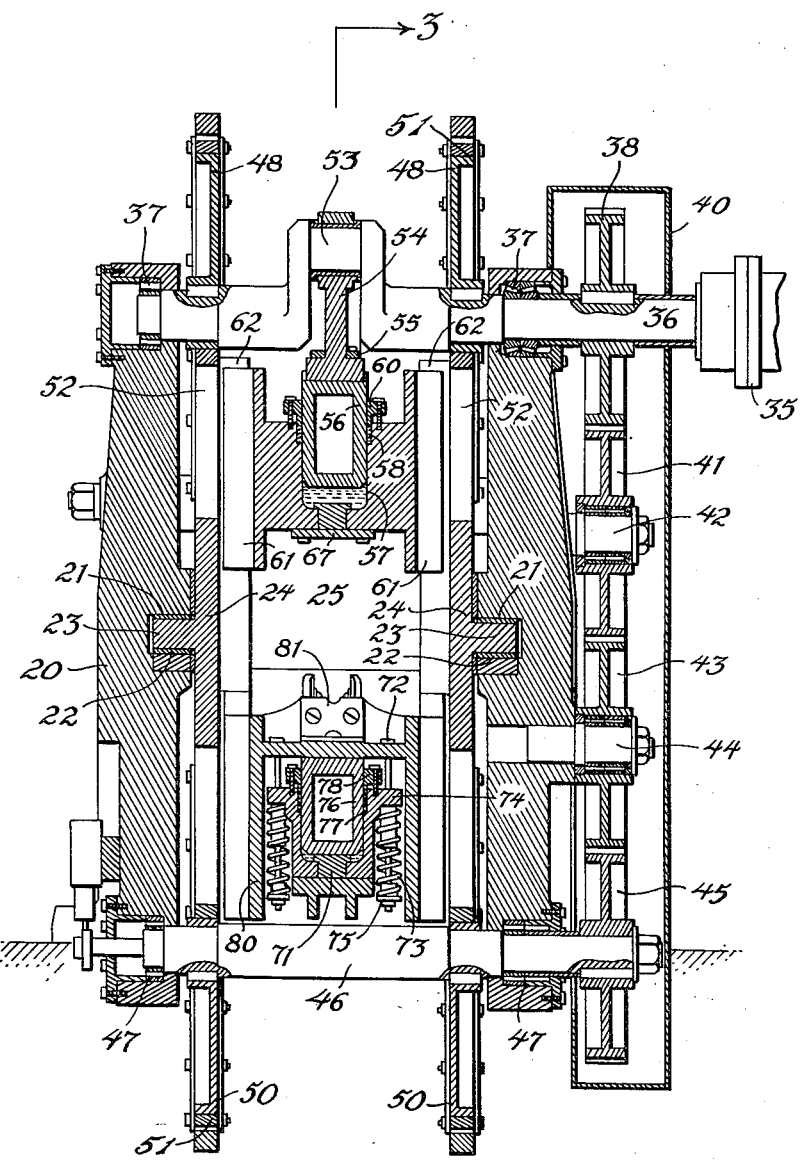
Figure 2 is a vertical transverse section of Figure 1 on the line 2—2.

Describing in illustration but not in limitation and referring to the drawings:

Several different types of flying shears have been produced and generally used for cutting bars, shapes and other metallic stock or work usually coming from the rolling mill in the process of the production of steel or other metals and alloys. Extensive use has been made of the "grasshopper" shear and also of the rotary drum flying shear. The rotary drum flying shear requires a ratio of drum diameter to bar diameter which is relatively large in order to secure proper cutting action, and because of this factor this type of shear is limited in its adaptability to relatively small sizes of stock. None of the prior art flying shears is fully satisfactory from the standpoint of the quality of the cut. There is a tendency to produce a slight lateral deformation or hook in the end of the bar.

The present invention is designed particularly to produce a reliably satisfactory and reasonably priced flying shear which will secure a substantially clean cut, with little or no tendency to deform the work laterally adjacent the cut, and therefore without appreciable tendency to cause bending or hooking of the ends of the work.

In accordance with the invention, the work is gripped between gags adjacent the point of cut during the cutting operation. Furthermore the operation of the shears themselves is made dependent upon the gripping, since it it the transmission of pressure from the further tendency of the gripping elements to move toward one another which causes the shearing action. This reliably assures that the clamping pressure is greater than the shearing pressure, thus eliminating the tendency to deform the ends adjacent the cut.

Furthermore the work in accordance with the invention lies level on the aproach and run-out table rollers at all times during the cutting operation and is not depressed below or lifted up above the table rollers to any serious extent in cutting as in conventional shears. The cut end is only lifted off the table rollers by the amount of its own thickness, and not a predetermined amount equal to the maximum shear stroke, and the bar is lying loosely on the table rollers at that time, so that there will not be an appreciable tendency to deform the bar. By this means an extremely high quality of cut end is obtained.

In accordance with the invention, the flying shear travels on a carriage at a speed which equals the forward speed of the work at the moment of cutting, and at the same time a top ram is lowered which carries the top gag. If no bar is in the shear the top gag just meets the bottom gag and no operation of the shear blades occurs. However, if a bar is present between the gags, the top gag clamps the bar against the bottom gag which may permissibly be mounted in stationary position on the carriage. Continuance of the stroke of the top ram traps hydraulic liquid and this is used to operate one of the shear blades, desirably the lower shear blade, against the upper shear blade which is carried with the top gag.

The shear has a main frame 20 which carries a longitudinal guideway 21 extending horizontally on each side in the direction of stock motion. The longitudinal guideway 21 has bottom and interior guide bearings 22 which receive a guide block 23 on a shear carriage 24 which moves longitudinally in the direction of stock travel at the time of the cut.

The shear carriage has an opening 25 extending longitudinally in the interior and this opening is in line with a set of roller guides 26 on opposite sides of the mechanism, which are driven to progress the stock in the direction of motion of the carriage at the time of cut, by motors 27 and chain drives 28 suitably interconnected to the respective rollers by chain driving connections 30.

The main drive of the mechanism is accomplished by motors 31 coupled together at 32 and driving a speed reducer 33. A brake is provided at 34 to stop the motion when desired. The output of the speed reducer is carried through coupling 35 to crank shaft 36 mounted on bearings 37 in the frame. The crank shaft carries gear 38 in gear box 40 which connects to gear 41 journalled on stub shaft 42, which in turn connects to gear 43 journalled on stub staft 44 which in turn connects to gear 45 on bottom eccentric shaft 46 journaled in bearings 47 in the frame. The shafts 36 and 46 turn in opposite directions at the same speed.

At the opposite ends of shaft 36 there are keyed thereon eccentrics 48 acting in unison while at opposite ends of the shaft 46 there are keyed thereon eccentrics 50 acting in unison. The eccentrics 50 are placed geometrically 180° out of phase with the eccentrics 48 but positioned so that they will act in unison as to translatory motion since the shafts are moving in opposite directions.

The eccentrics in each case are externally circular and surrounded by engaging eccentric blocks 51 which have vertical sides engaging and moving up and down in vertical guideways 52 in the carriage so that the carriage is reciprocated horizontally by the motion of the eccentrics and at the time of the shear cut will be moving with the stock at the same speed as the stock.

The shaft 36 at its center has a crank 53 which pivotally connects to a pitman 54 in a pitman bearing 55 at the top of an upper ram 56 which moves up and down in an upper cylinder 57 sealed by packing 58 tightened by a gland 60.

The upper cylinder 57 has vertical guiding shoes 61 which engages vertical guideways 62 on the carriage, and the cylinder is retracted to its raised position by helical compression springs 64 surrounding pull rods 64 on the upper part of the carriage, the springs acting between lugs 65 on the upper cylinder and spring retainers 66 on the lower ends of the pull rods.

At the bottom the cylinder mounts an upper clamping gag 67 adapted to engage the top of the stock. The upper shear blade 68 is desirably secured to one side of the gag 67.

The carriage supports below the line of stock travel a lower gag 70 which is desirably in position to be engaged by the work as it travels across the feed rollers 26. The lower gag 70 is in line with the upper gag 67 so that when the upper gag moves down the gags grip on opposite sides of the stock.

A lower cylinder 71 is mounted on the carriage. A lower ram 76 in cylinder 71 is spring retracted by pull rods 72 anchored in the lower ram and surrounded by spiral compression springs 73 which act between lugs 74 on the cylinder and spring retainers 75 on the pull rods. The lower ram 76 acts in and cooperates with the lower cylinder, sealing being accomplished by packing 77 compressed by gland 78.

The lower ram 76 has guiding extensions 80 at the sides which extend into guiding relation with the vertical guides 62 on the carriage. The lower ram mounts at the top a lower shear blade 81 which is lined up to cooperate with the upper shear blade 68.

Figure 3:
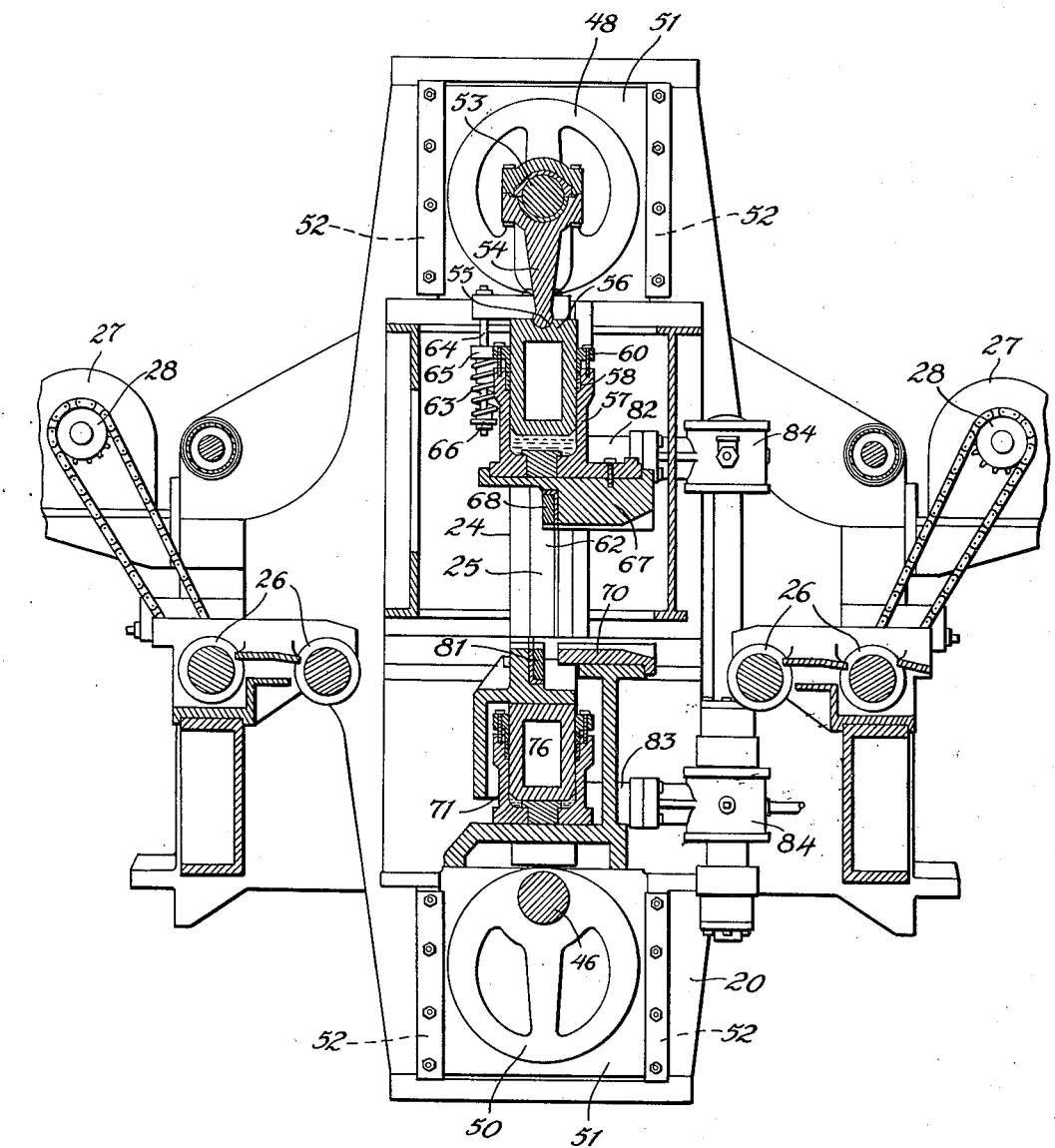
Figure 3 is a longitudinal vertical section on the line 3—3 of Figure 2.

The upper cylinder has a connecting pipe 82 and the lower cylinder has a connecting pipe 83 both extending out to the side and moving with the carriage, as best seen in Figure 3. Pipes 82 and 83 respectively connect to slide pipes 84 which at the time of operation receive hydraulic liquid from a suitable source, not shown.

In operation, the shear will normally remain inoperative when not in use, and the stock can pass through the shear without being cut.

When it is desired to make a cut, the drive carries the carriage forward at a speed which synchronizes with the speed of the work, and the upper gag is carried downward by the pitman, upper ram, hydraulic liquid of the upper cylinder and upper cylinder until it grips the work. Further movement of the upper ram forces hydraulic liquid from the upper cylinder which enters the lower cylinder and operates the lower ram to raise the lower shear blade and accomplish shearing against the upper shear blade. Since it is the thickness of the stock which, clamped between the gags, provides the resistance to force the hydraulic liquid from the upper cylinder to the lower cylinder, and since the cylinders are of the same diameter, the lower shear blade moves up a distance exactly corresponding to the thickness of the stock, thus avoiding unnecessary travel of the parts and unnecessary rubbing of the shear blades against the ends of the stock.

Springs 63 retract the upper cylinder and the pitman retracts the upper ram. Springs 73 retract the lower ram.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a flying shear for shearing stock which is in motion, a carriage, means for advancing the carriage with the stock, gags on the carriage respectively on opposite sides of the stock, shear blades on the carriage in mating relation on opposite sides of the stock, first hydraulic ram and cylinder means on the carriage operatively mounting one gag and one shear blade on one side of the stock and moving one gag and one shear blade toward the stock, moving said one gag toward the other gag, and moving said one shear blade toward mating relation with the other shear blade, second hydraulic ram and cylinder means operatively mounting the other shear blade and moving the other shear blade toward mating relation with the one shear blade, a constantly open hydraulic connection between the first cylinder means and the second cylinder means, and mechanism for moving the first hydraulic ram and cylinder means bodily toward the stock, whereby the application of force which makes the gags engage the stock transfers hydraulic fluid from the first cylinder means to the second cylinder means to move the other shear blade and shear the stock.

2. A flying shear of claim 1, in combination with first guide means on the carriage guiding the first hydraulic ram and cylinder means in a direction transverse to the stock, and second guide means on the carriage guiding the second hydraulic ram and cylinder means in a direction transverse to the stock.

3. In a shear, means for guiding the work along a work path, a first gag on one side of the work path, a second cooperating gag on the other side of the work path, a first shear blade on one side of the work path, a second cooperating shear blade on the other side of the work path, means for moving the gags relatively toward one another and into engagement with opposite sides of the work, and hydraulic means operative when the work is engaged between the gags for moving the shear blades into relative cutting relation with the work.

4. A shear according to claim 3, in which the hydraulic means includes a first ram, means for moving the first ram toward the work, a hydraulic cylinder cooperating with the first ram, movable toward the work, and mounting the first gag and the first shear blade, a second ram, a hydraulic cylinder cooperating with the second ram, movable toward the work and mounting the second shear blade, and hydraulic connections between the respective hydraulic cylinders.

5. A shear according to claim 3, in which the hydraulic means includes first hydraulic mechanism moving with the first gag and second hydraulic mechanism for operating one of the shear blades when the first gag engages the work.

6. A shear according to claim 5, in which the second hydraulic mechanism operates the second shear blade.

7. A shear according to claim 3, in combination with a carriage mounting the mechanism of claim 1, and means for progressing the carriage forward at the same speed as the work.

8. A shear according to claim 4, in which the rams and cylinders are of the same size and the shear blades relatively move together beyond the position of gag engagement with the stroke a distance equal to the thickness of the work.

9. In a shear, a carriage, guides for the carriage, means for advancing the carriage at the same speed as the work, a lower gag mounted on the carriage, an upper gag cooperating with the lower gag in the carriage, an upper cylinder mounting the upper gag, guide means on the carriage permitting the upper cylinder to move toward the work, an upper shear blade mounted on the upper cylinder, an upper ram in the upper cylinder, means for advancing the upper ram toward the work, a lower cylinder on the carriage, a lower ram in the lower cylinder movable toward the work, hydraulic connections between the upper cylinder and the lower cylinder, and a lower shear blade on the lower ram cooperating with the upper shear blade.

10. A shear according to claim 9, in combination with spring means to retract the upper cylinder.

11. A shear according to claim 9, in combination with spring means for retracting the lower ram.

References Cited in the file of this patent

UNITED STATES PATENTS

| | | |
|---|---|---|
| 2,220,236 | Haegele | Nov. 5, 1940 |
| 2,261,007 | Talbot | Oct. 28, 1941 |
| 2,278,713 | Riddle | Apr. 7, 1942 |
| 2,366,443 | Deans | Jan. 2, 1945 |
| 2,552,958 | Graham | May 15, 1951 |
| 2,699,649 | Messick | Jan. 18, 1955 |